F. G. HASCHKE.
LIVE BAIT BUCKET.
APPLICATION FILED JUNE 21, 1919.

1,327,040.

Patented Jan. 6, 1920.

Witness
F. B. Wooden.

Inventor,
F. G. Haschke
By C. A. Snow & Co.
Attorneys.

UNITED STATES PATENT OFFICE.

FEODOR G. HASCHKE, OF AUSTIN, TEXAS, ASSIGNOR OF ONE-HALF TO JOHN C. WALL, OF AUSTIN, TEXAS.

LIVE-BAIT BUCKET.

1,327,040.         Specification of Letters Patent.         Patented Jan. 6, 1920.

Application filed June 21, 1919. Serial No. 305,750.

*To all whom it may concern:*

Be it known that I, FEODOR G. HASCHKE, a citizen of the United States, residing at Austin, in the county of Travis and State of Texas, have invented a new and useful Live-Bait Bucket, of which the following is a specification.

This invention relates to a receptacle for the conveyance and imprisonment of live fishing-bait and has for its object the provision of a receptacle that may be inexpensively manufactured, that may be collapsed into small compass for transportation, that will float and provide for free circulation of water to the bait when overboard and from which the bait may be readily withdrawn.

With these and other objects in view as will appear from the following description and appended claims taken in connection with the drawing, in which the preferred embodiment of the invention has been shown, it is to be understood that slight changes may be made therein, within the scope of the claims, without departing from, or sacrificing any of the advantages of the invention.

Referring to the drawings: Figure 1 is a sectional view of the device in extended position, Fig. 2 is a plan view of the device;

Figure 1:
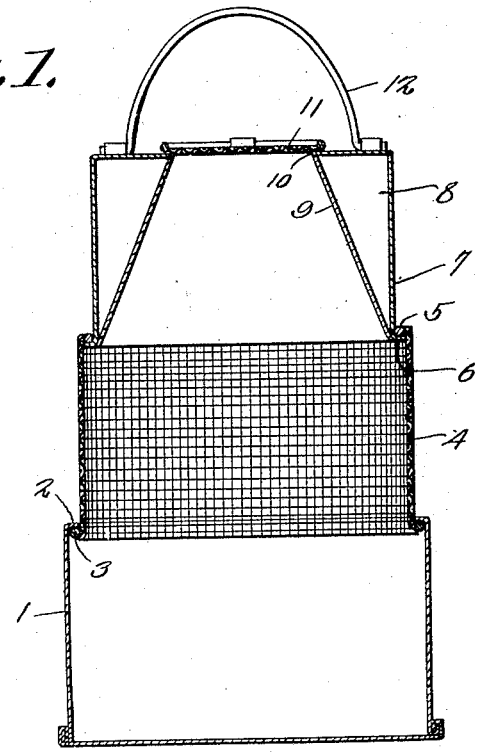
Figure 2:
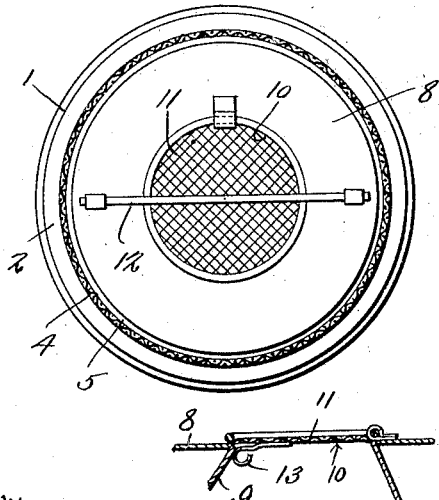

The receptacle forming the subject matter of this invention commonly known as a minnow bucket consists of a number of telescopic sections, the bottom section 1 forms a container of ample proportions for the retention of sufficient water, when the bucket is out of the water, to keep the bait alive for a time.

The top edge of the container 1 is inturned to form a flange 2, which is adapted, when the bucket is extended, to engage and rest on, a flange 3, formed on the outside and lower edge of a cage 4. The cage 4 is made of wire screen cloth or like foraminous material and is provided at the top edge with an inturned flange 5, which engages a flange 6 on an upper top section 7. The upper section forms a closure for the lower sections and is provided with an air-tight compartment 8 which forms a float for the bucket, having displacement sufficient to keep the bucket afloat at the surface. The inner side wall 9 of the float chamber is inclined from the lower edge of the outer wall to the top of the float chamber where it defines an opening 10 for access to the bucket.

A hinged lid 11 of wire cloth closes the opening 10 and is provided with a spring fastening device 13. A bail 12 is secured to the top of the float chamber and serves as a carrying handle. The inclined wall 9 of the float eliminates any objectionable angles or corners near the top of the bucket and thus makes withdrawal of bait comparatively easy.

Figure 3:
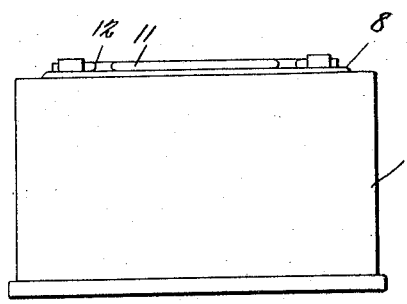
Fig. 3 is an elevation of the receptacle in collapsed position.
Figure 4:
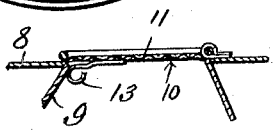
Fig. 4 is a detail sectional view of the top.

With the several sections nested as shown in Fig. 3, it will be seen the receptacle occupies but little space when not in use.

What is claimed is:—

1. In a live bait bucket comprising as coöperating parts a float section, a foraminous section and a liquid container, each being provided with interengaging flanges whereby the several sections may be joined together in extended position and nested together in collapsed position, the float section comprising an annular member having an inner side wall inclined from the bottom of said section to the top thereof to define an opening for the removal of bait and a bail secured to the top of the float section whereby the several sections may be bodily transported.

2. A live bait bucket comprising as coöperating parts, a lower liquid container, an intermediate foraminous section and an upper float section, the liquid container being provided with an inturned flange about its upper end for engaging an outturned flange formed on the lower end of the foraminous section whereby the said sections are mounted for telescopic movement and for limited extensible movement, the float section and the foraminous section being provided with interengaging flanges, whereby the float section may be telescoped within the foraminous section and a bail secured to the float section whereby the float section, the foraminous section and the liquid container may be transported in extended position.

In testimony that I claim the foregoing as my own, I have hereto affixed my signature in the presence of two witnesses.

FEODOR G. HASCHKE.

Witnesses:
   HARRY A. SEIBT,
   H. E. BECKER.